United States Patent
Ito et al.

(10) Patent No.: US 11,861,106 B2
(45) Date of Patent: Jan. 2, 2024

(54) DETECTION DEVICE AND DETECTION METHOD

(71) Applicant: Shanghai Tianma Micro-Electronics Co., Ltd., Shanghai (CN)

(72) Inventors: Yuki Ito, Kanagawa (JP); Yukihiro Ito, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/970,998

(22) Filed: Oct. 21, 2022

(65) Prior Publication Data
US 2023/0136362 A1    May 4, 2023

(30) Foreign Application Priority Data
Oct. 29, 2021    (JP) .................................. 2021-178055

(51) Int. Cl.
*G06F 3/041*    (2006.01)
*G06F 3/01*    (2006.01)
*G06F 3/044*    (2006.01)

(52) U.S. Cl.
CPC .......... *G06F 3/04166* (2019.05); *G06F 3/017* (2013.01); *G06F 3/0443* (2019.05); *G06F 2203/04108* (2013.01)

(58) Field of Classification Search
None
See application file for complete search history.

(56) References Cited

U.S. PATENT DOCUMENTS

| | | | |
|---|---|---|---|
| 2003/0206162 A1* | 11/2003 | Roberts | G06F 3/04142 345/173 |
| 2011/0153263 A1* | 6/2011 | Oda | G06F 3/0445 702/150 |
| 2016/0077600 A1 | 3/2016 | Giebeler et al. | |
| 2019/0018527 A1* | 1/2019 | Barel | G06F 3/0418 |

FOREIGN PATENT DOCUMENTS

JP    2016-526213 A    9/2016

* cited by examiner

*Primary Examiner* — Duane N Taylor, Jr.
(74) *Attorney, Agent, or Firm* — Sughrue Mion, PLLC

(57) ABSTRACT

A detection device includes a sensor including a driving electrode and detection electrodes and a controller detecting a non-contact target from signal waveforms acquired from the detection electrodes by applying a voltage to the driving electrode, the signal waveforms each indicating a change in signal strength over time. The controller discriminates a peak caused by the non-contact target on the basis of a time width from a rising start point of a peak to a peak top of the peak, a height from the rising start point of the peak to the peak top of the peak, and a slope of a rising side of the peak.

11 Claims, 15 Drawing Sheets

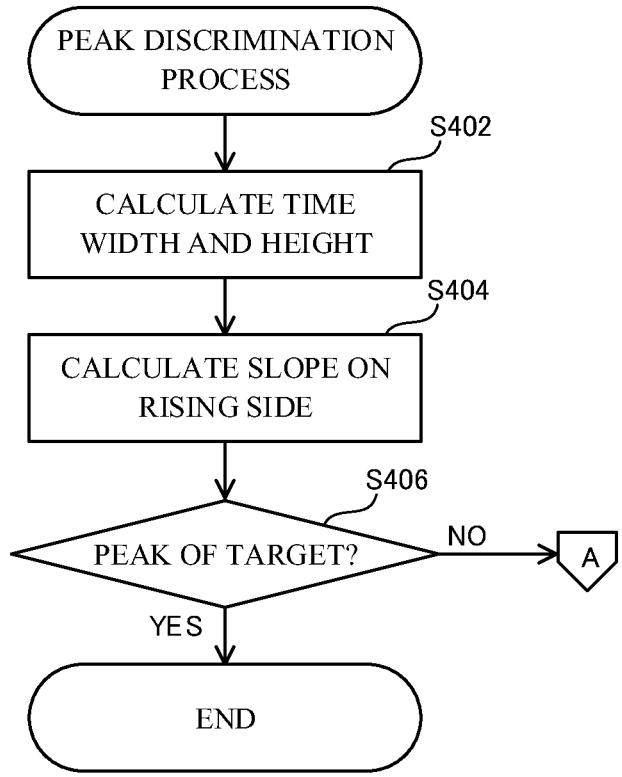
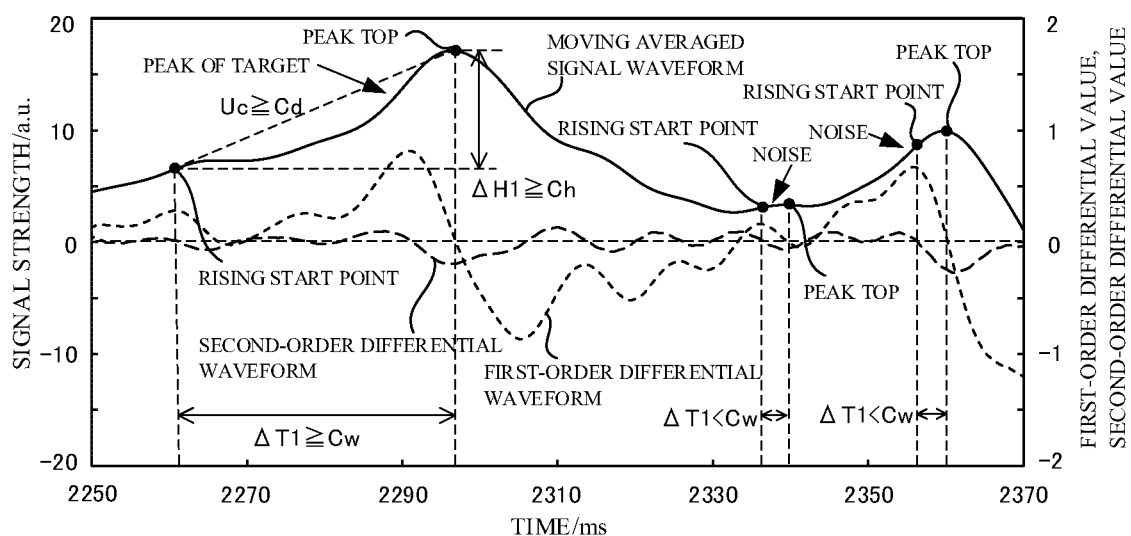

FIG.15

NON-CONTACT DETECTION PROCESS
↓
ARRANGE DETECTION ELECTRODES IN TIME ORDER OF PEAK TOP — S502
↓
DETECT MOVEMENT OF TARGET? — S504
— NO → A
— YES ↓
OUTPUT SIGNAL REPRESENTING MOVEMENT OF TARGET — S506
↓
END

FIG.16

| TIME ORDER OF PEAK | MOVEMENT OF TARGET |
|---|---|
| 26b→26c→26d→26e | FLICK GESTURE FROM −X DIRECTION TO +X DIRECTION |
| 26b→26c→26d, 26e | FLICK GESTURE FROM −X DIRECTION TO +X DIRECTION |
| ⋮ | ⋮ |
| 26a→26b, 26c, | FLICK GESTURE FROM +Y DIRECTION TO −Y DIRECTION |
| ⋮ | ⋮ |
| 26e→26d→26c→26b | FLICK GESTURE FROM +X DIRECTION TO −Y DIRECTION |
| ⋮ | |

VIRTUAL DETECTION ELECTRODES 26b-26e

| TIME ORDER OF PEAK | MOVEMENT OF TARGET |
|---|---|
| 26a→26b, 26c, 26d, 26e | FLICK GESTURE FROM +Y DIRECTION TO −Y DIRECTION |
| 26a→26b→26c, 26d, 26e | FLICK GESTURE FROM +Y DIRECTION TO −Y DIRECTION |
| 26a→26b, 26c→26d, 26e | FLICK GESTURE FROM +Y DIRECTION TO −Y DIRECTION |
| 26a→26b, 26c, 26d→26e | FLICK GESTURE FROM +Y DIRECTION TO −Y DIRECTION |
| ⋮ | |

DETECTION DEVICE AND DETECTION METHOD

CROSS-REFERENCE TO RELATED APPLICATION

This application claims the benefit of Japanese Patent Application No. 2021-178055, filed on Oct. 29, 2021, the entire disclosure of which is incorporated by reference herein.

FIELD

This application relates generally to a detection device and a detection method.

BACKGROUND

There is a demand for an interface that receives user's instructions by user gestures. For example, Unexamined Japanese Patent Application Publication (Translation of PCT Application) No. 2016-526213 discloses a switch actuation device including a gesture sensor configured to output a signal having signal shake corresponding to temporal intensity change of detected heat for each pixel that detects heat when a translational gesture is performed. In Unexamined Japanese Patent Application Publication (Translation of PCT Application) No. 2016-526213, a signal caused by the translational gesture and a noise signal are discriminated by inspecting whether an absolute value of the signal shake exceeds a predetermined level.

In Unexamined Japanese Patent Application Publication (Translation of PCT Application) No. 2016-526213, since the signal caused by the gesture and the noise signal are discriminated only by the absolute value of the signal shake, when the level of the signal caused by the gesture is small (when the distance between the sensor and the gesture is long), discrimination between the signal caused by the gesture and the noise signal is difficult.

SUMMARY

A detection device according to a first aspect of the present disclosure includes:
  a sensor that includes a driving electrode and detection electrodes; and
  a controller that detects a non-contact target from signal waveforms acquired from the detection electrodes by applying a voltage to the driving electrode, the signal waveforms each indicating a change in signal strength over time,
  wherein the controller discriminates a peak caused by the non-contact target on the basis of a time width from a rising start point of a peak to a peak top of the peak, a height from the rising start point of the peak to the peak top of the peak, and a slope of a rising side of the peak, in the signal waveform.

A detection method according to a second aspect of the present disclosure includes:
  acquiring signal waveforms from detection electrodes by applying a voltage to a driving electrode;
  the signal waveforms each indicating a change in signal strength over time, discriminating a peak caused by a non-contact target on the basis of a time width from a rising start point of a peak to a peak top of the peak, a height from the rising start point of the peak to the peak top of the peak, and a slope of a rising side of the peak, in the signal waveform; and
  detecting the non-contact target on the basis of the discriminated peak caused by the non-contact target.

It is to be understood that both the accordingly general description and the following detailed description are granular and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 13 is a flowchart illustrating a peak discrimination process according to Embodiment 1;

FIG. 14 is a diagram illustrating an example of a peak of a target according to Embodiment 1;

FIG. 15 is a flowchart illustrating a non-contact detection process according to Embodiment 1;

FIG. 16 is a diagram illustrating an example of a lookup table according to Embodiment 1;

DETAILED DESCRIPTION

Hereinafter, a detection device according to embodiments is described with reference to the drawings.

Embodiment 1

A detection device 10 according to the present embodiments is described with reference to FIGS. 1 to 16. The detection device 10 detects a non-contact target (for example, a user's gesture). First, the overall configuration of the detection device 10 is described.

Figure 1:
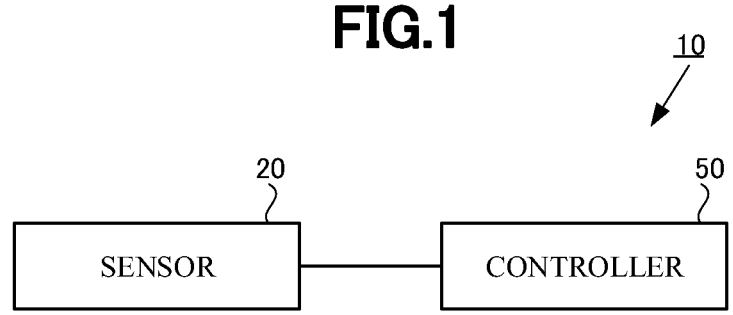
FIG. 1 is a diagram illustrating a detection device according to Embodiment 1.
Figure 2:
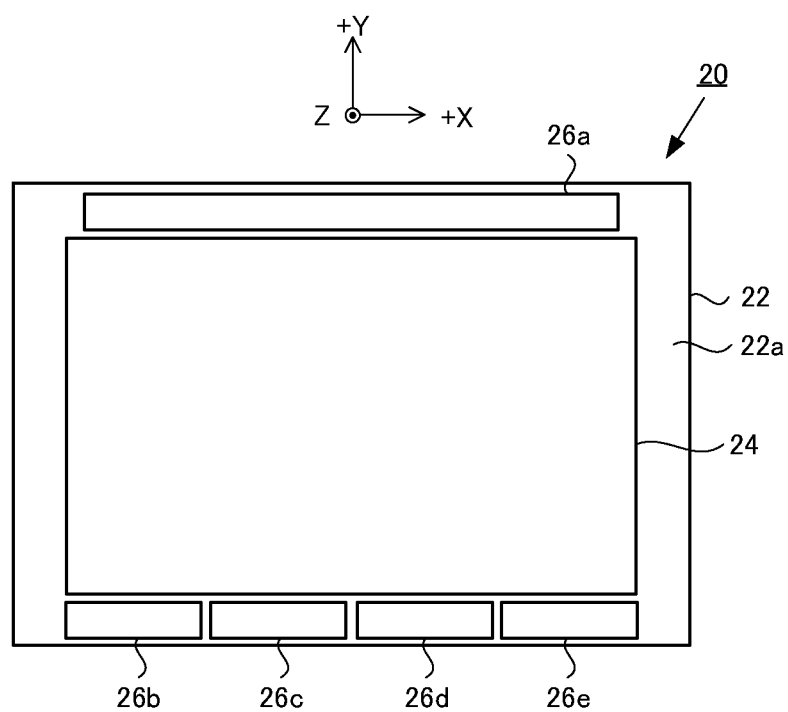
FIG. 2 is a plan view illustrating a sensor according to Embodiment 1.

As illustrated in FIG. 1, the detection device 10 includes a sensor 20 and a controller 50. As illustrated in FIG. 2, the sensor 20 includes a light-transmissive substrate 22, a driving electrode 24, and detection electrodes 26a to 26e. The driving electrode 24 and the detection electrodes 26a to 26e are formed on the light-transmissive substrate 22. The controller 50 detects a non-contact target from signal waveforms acquired from the detection electrodes 26a to 26e by applying a voltage to the driving electrode 24, the signal waveforms each indicating a temporal change in the signal strength of a signal representing capacitance. In the present specification, in order to facilitate understanding, the following description is given on the assumption that in FIG. 2, the right direction (right direction of the paper surface) of the sensor 20 is a +X direction, an upward direction (upward direction of the paper surface) is a +Y direction, and a direction perpendicular to the +X direction and the +Y direction (front direction of the paper surface) is a +Z direction. The signal representing capacitance is also referred to as "signal", and the signal strength of the signal representing the capacitance is also referred to as "signal strength".

Figure 3:
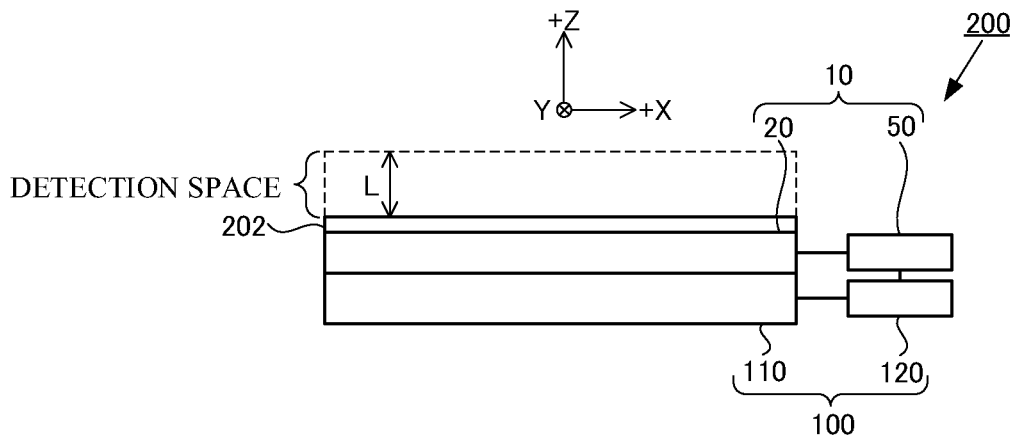
FIG. 3 is a schematic diagram illustrating a display unit according to Embodiment 1.

As illustrated in FIG. 3, the detection device 10 constitutes a display unit 200 together with a display device 100. The display unit 200 is mounted on a smartphone, a laptop computer, an information display, or the like. The display device 100 includes a display panel 110 and a display controller 120. The display panel 110 displays characters, images, or the like. The display panel 110 is a liquid crystal display panel, an organic electroluminescence (EL) display panel, or the like. The display controller 120 controls the display of the display panel 110. The display controller 120 and the controller 50 of the detection device 10 are connected to each other.

The sensor 20 of the detection device 10 is provided on a display surface side of the display panel 110 via an adhesive layer (not illustrated). In this case, the driving electrode 24 of the sensor 20 is located above a display area of the display panel 110, and the detection electrodes 26a to 26e of the sensor 20 are located above the outer periphery of the display area of the display panel 110. Furthermore, a protective cover 202 made of resin is provided on the sensor 20 via an adhesive layer (not illustrated). The detection device 10 detects a non-contact target located in a detection space on the sensor 20. As a result, the detection device 10 serves as an interface for receiving a user's instruction for the display of the display device 100. A thickness L of the detection space is, for example, 150 mm.

Next, a specific configuration of the detection device 10 is described. As illustrated in FIG. 2, the sensor 20 of the detection device 10 includes the light-transmissive substrate 22, the driving electrode 24, and the detection electrodes 26a to 26e.

The light-transmissive substrate 22 of the sensor 20 is, for example, a glass substrate. The light-transmissive substrate 22 includes a first main surface 22a.

The driving electrode 24 of the sensor 20 is provided on the first main surface 22a of the light-transmissive substrate 22. The driving electrode 24 has a rectangular shape and is provided in a central portion of the first main surface 22a. In the present embodiment, the driving electrode 24 covers the display area of the display panel 110 when viewed in the plan view. The driving electrode 24 is electrically connected to the controller 50 via a wiring (not illustrated).

The detection electrodes 26a to 26e of the sensor 20 are provided on the first main surface 22a of the light-transmissive substrate 22, respectively. The detection electrode 26a is arranged on the +Y side of the driving electrode 24 and extends in the X direction. The detection electrodes 26b to 26e are arranged side by side in the X direction on the —Y side of the driving electrode 24. Each of the detection electrodes 26a to 26e is electrically connected to the controller 50 via a wiring (not illustrated).

The driving electrode 24 and the detection electrodes 26a to 26e are formed of, for example, indium tin oxide (ITO). The driving electrode 24 and the detection electrodes 26a to 26e form capacitance between a target (for example, a user's finger or hand, a pen, or the like).

Figure 4:
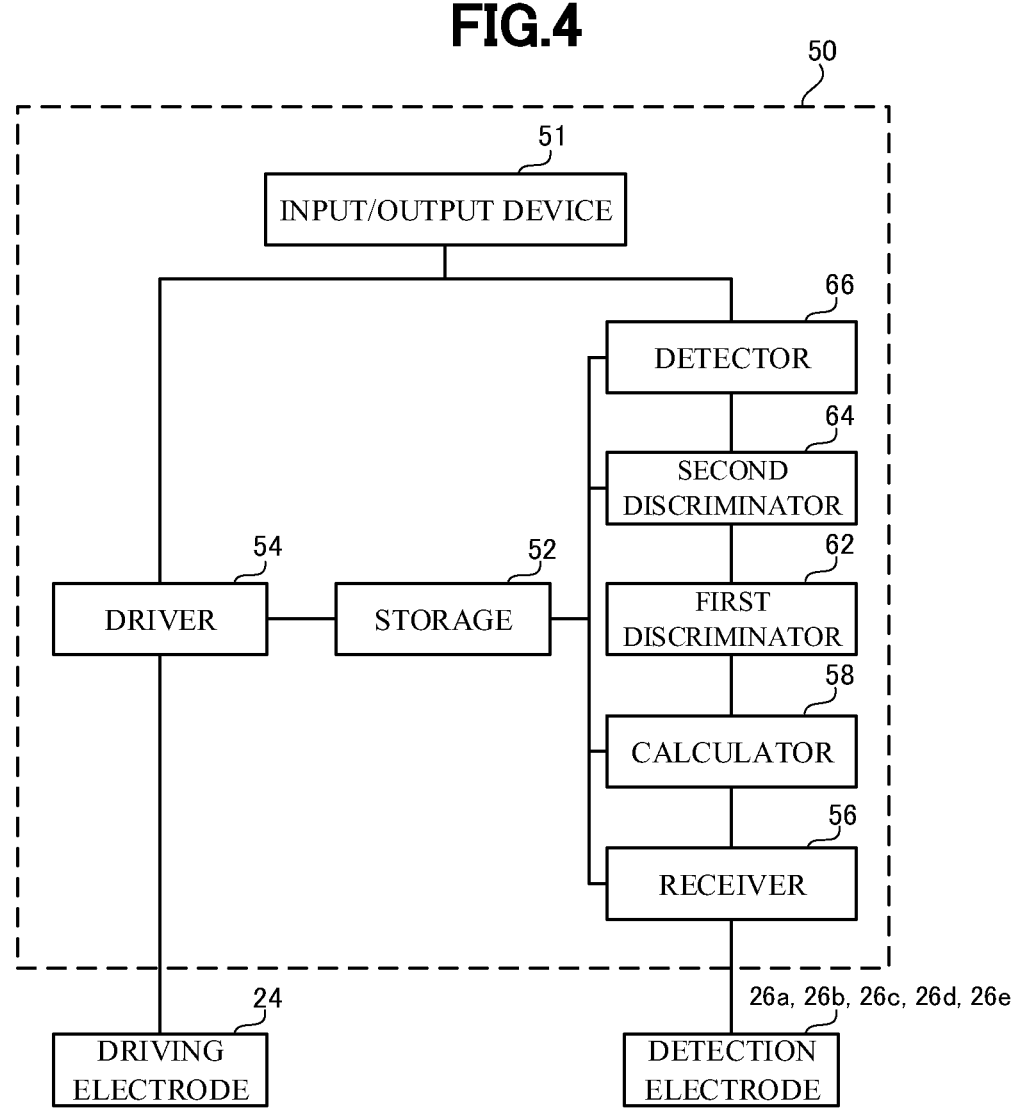
FIG. 4 is a block diagram illustrating the configuration of a controller according to Embodiment 1.

The controller 50 of the detection device 10 detects a non-contact target from the signal waveforms acquired from the detection electrodes 26a to 26e, the signal waveforms each indicating a temporal change in the signal strength of the signal representing the capacitance. First, the functional configuration of the controller 50 is described. As illustrated in FIG. 4, the controller 50 includes an input/output device 51, a storage 52, a driver 54, a receiver 56, a calculator 58, a first discriminator 62, a second discriminator 64, and a detector 66.

The input/output device 51 of the controller 50 inputs/outputs a signal between the controller 50 and the display controller 120 of the display device 100, a signal between the detector 66 and a controller of an electronic device, or the like.

The storage 52 of the controller 50 stores a program, data, a signal received by the receiver 56 and representing capacitance, a signal waveform indicating a change in a signal strength over time, or the like.

The driver 54 of the controller 50 applies a voltage to the driving electrode 24 on the basis of an instruction from the controller of the electronic device transmitted via the input/output device 51. The receiver 56 of the controller 50 receives the signals representing the capacitance from the detection electrodes 26a to 26e.

Figure 5:
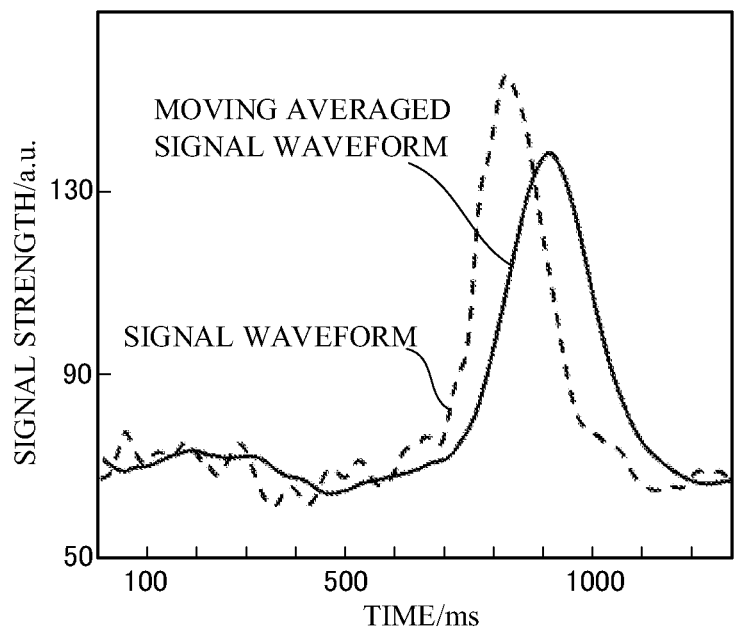
FIG. 5 is a diagram illustrating a moving averaged signal waveform according to Embodiment 1.
Figure 6:
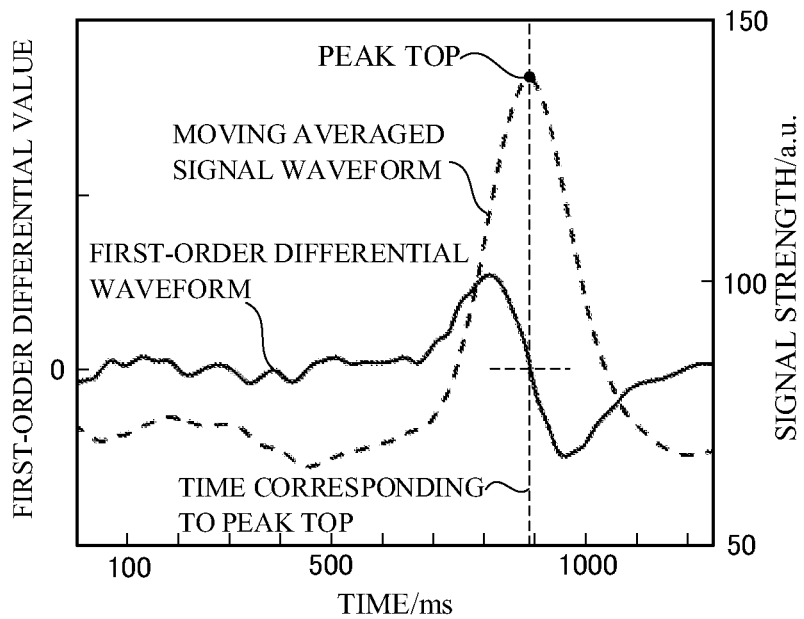
FIG. 6 is a diagram illustrating a first-order differential waveform according to Embodiment 1.
Figure 7:
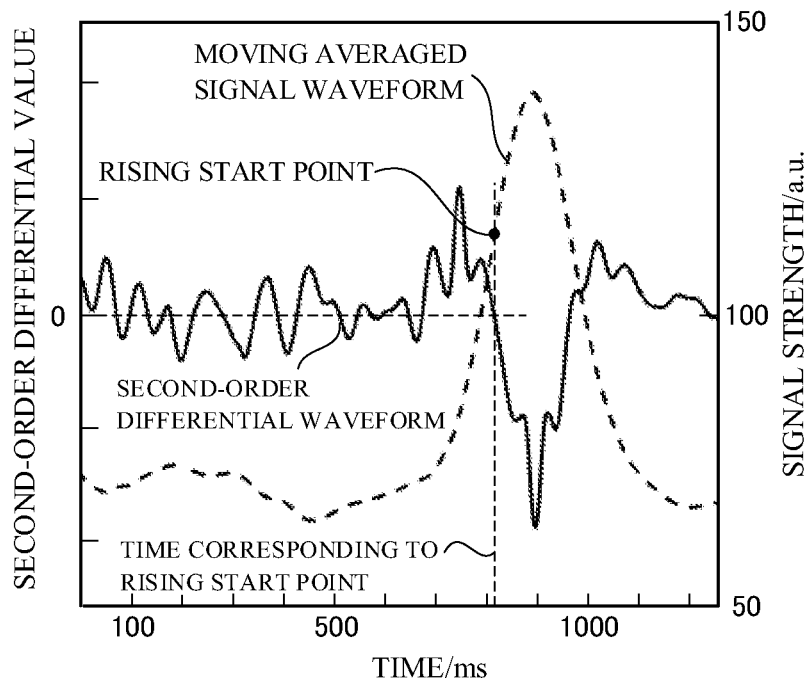
FIG. 7 is a diagram illustrating a second-order differential waveform according to Embodiment 1.
Figure 8:
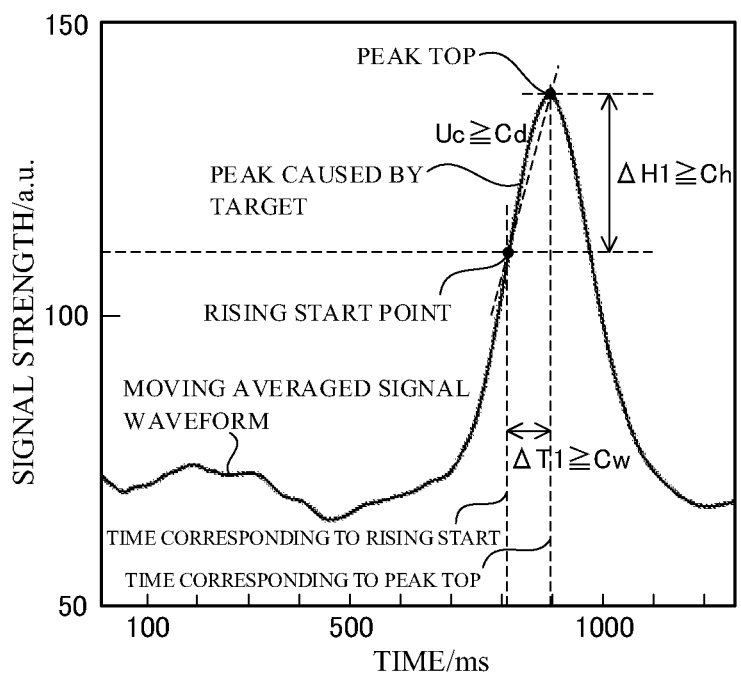
FIG. 8 is a diagram illustrating a rising start point and a peak top of a peak in a moving averaged signal waveform according to Embodiment 1.

The calculator 58 of the controller 50 calculates a moving averaged signal waveform by performing a moving average process on the signal waveform indicating the temporal change in the signal strength of the signal received by the receiver 56 (FIG. 5). This makes it possible to remove fine noise. Moreover, as illustrated in FIGS. 6 and 7, the calculator 58 calculates a first-order differential waveform and a second-order differential waveform of the moving averaged signal waveform.

On the basis of the first-order differential waveform and the second-order differential waveform of the moving averaged signal waveform, the first discriminator 62 of the controller 50 discriminates a rising start point of a peak and a peak top of the peak in the moving averaged signal waveform. Specifically, as illustrated in FIGS. 6 and 7, the first discriminator 62 sets, as a time corresponding to the rising start point of the peak, a time when a value of the second-order differential waveform changes from a positive value to a negative value and a value of the first-order differential waveform is a positive value. Furthermore, the first discriminator 62 sets, as a time corresponding to the peak top of the peak, an initial time when the value of the first-order differential waveform changes from a positive value to a negative value in the direction in which time elapses from the time corresponding to the rising start point of the peak. Moreover, the first discriminator 62 discriminates the rising start point of the peak and the peak top of the peak from the time corresponding to the rising start point of the peak and the time corresponding to the peak top of the peak. Hereinafter, the rising start point of the peak is also referred to as a "rising start point" and the peak top of the peak is also referred to as a "peak top".

When the peak top is not discriminated even after a predetermined first period (for example, 100 ms) elapses from the time corresponding to the rising start point (that is, when the time corresponding to the rising start point and the time corresponding to the peak top are out of the predetermined first period), the first discriminator 62 may re-discriminate that a point, which has been discriminated as the rising start point, is not the rising start point, and re-discriminate the rising start point in the direction in which time elapses.

On the basis of a time width ΔT1 from the rising start point to the peak top, a height ΔH1 from the rising start point to the peak top, and a slope Uc (Uc=ΔH1/ΔT1) on a rising side of the peak, the second discriminator 64 of the controller 50 discriminates a peak caused by the non-contact target in the moving averaged signal waveform. Specifically, the second discriminator 64 discriminates, as the peak caused by the non-contact target in the moving averaged signal waveform, a peak in which the time width ΔT1 is equal to or greater than a predetermined first threshold value Cw (for example, 10 ms), the height ΔH1 is equal to or higher than a predetermined second threshold value Ch (for example, 10 a.u.), and the slope Uc on the rising side is equal to or greater than a third threshold value Cd (for example, 0.15). Hereinafter, the peak caused by the non-contact target is also referred to as a "peak of the target".

In the present embodiment, the peak of the target is discriminated on the basis of the time width ΔT1, the height ΔH1, and the slope Uc on the rising side. Consequently, the detection device 10 can discriminate the peak of the target even though the second threshold value Ch, which is the threshold value of the height ΔH1, is set to be small. That is, the detection device 10 can discriminate the peak of a target having a low signal strength. Furthermore, the detection device 10 discriminates the peak of the target from the rising start point and the peak top, which makes it possible to discriminate the peak of the target when the signal waveform reaches the peak top and to detect the non-contact target in a short time.

The detector 66 of the controller 50 detects the movement of the non-contact target from the time order of the peak tops of the peaks of the target in the moving averaged signal waveforms of the detection electrodes 26a to 26e. For example, when the peak tops of the peaks of the target appear in the order of the detection electrode 26d, the detection electrode 26c, and the detection electrode 26b from the detection electrode 26e located on the +X side in the direction in which time elapses, the detector 66 discriminates that a user has made a flick gesture from the +X direction to the −X direction, and detects the user's flick gesture from the +X direction to the −X direction.

The detector 66 outputs a signal representing the detected movement of the non-contact target to the controller of the electronic device provided with the detection device 10. The signal representing the movement of the non-contact target represents, for example, a key event, a message, or the like set by the user for the flick gesture in the −X direction. The signal representing the detected movement of the non-contact target may be output once or more times for one detection. The detected gesture may be a flick gesture from the +Y direction to the —Y direction, a circle gesture in which the non-contact target moves in a circle, or the like. Hereinafter, the movement of the non-contact target is also referred to as a "movement of the target".

Figure 9:
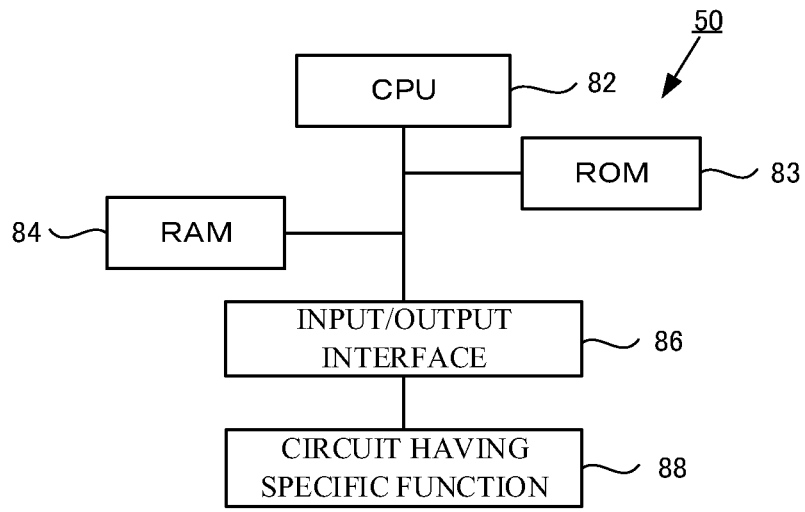
FIG. 9 is a block diagram illustrating the hardware configuration of the controller according to Embodiment 1.

FIG. 9 illustrates the hardware configuration of the controller 50. The controller 50 includes a central processing unit (CPU) 82, a read only memory (ROM) 83, a random access memory (RAM) 84, an input/output interface 86, and a circuit 88 having a specific function. The CPU 82 executes programs stored in the ROM 83. The ROM 83 stores programs, data, signals, or the like. The RAM 84 stores data. The input/output interface 86 inputs and outputs signals between these components. The circuit 88 having a specific function includes a driving circuit, a reception circuit, an arithmetic circuit, or the like. The functions of the controller 50 are implemented by the execution of the programs of the CPU 82 and functions of the circuit 88 having a specific function.

Figure 10:
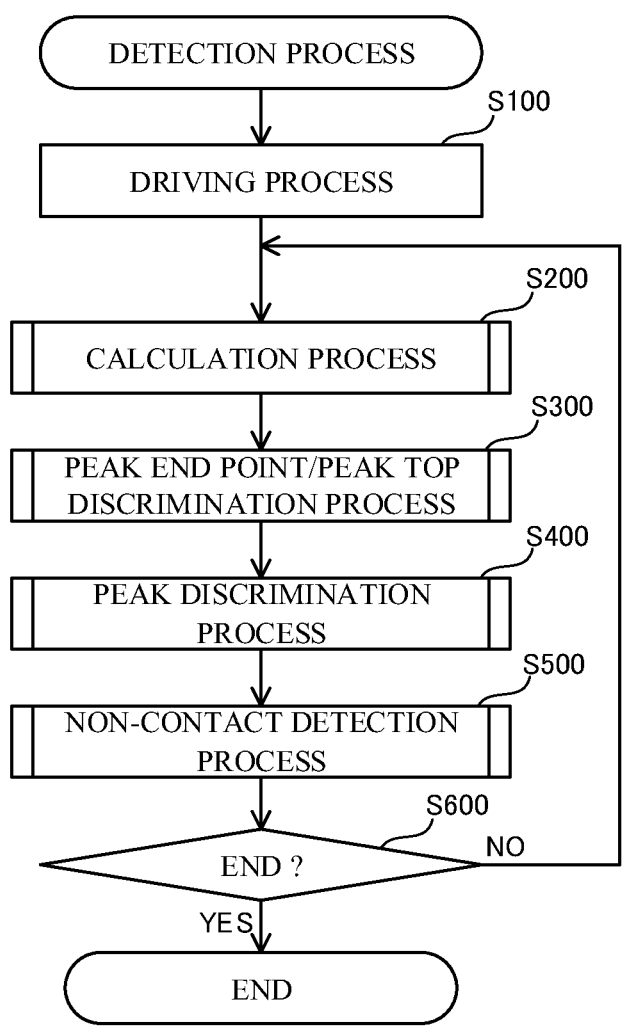
FIG. 10 is a flowchart illustrating a detection process according to Embodiment 1.

Next, a detection process (operation) of the detection device 10 is described with reference to FIGS. 10 to 16. Hereinafter, a case where the display unit 200 including the detection device 10 and the display device 100 is mounted on an electronic device is described. As illustrated in FIG. 10, the detection process of the detection device 10 is performed in the order of a driving process (step S100), a calculation process (step S200), a peak end point/peak top discrimination process (step S300), a peak discrimination process (step S400), and a non-contact detection process (step S500). After the non-contact detection process (step S500), when an end instruction is not input to the controller 50 (step S600; NO), the detection process of the detection device 10 returns to the calculation process (step S200). When the end instruction is input to the controller 50 (step S600; YES), the detection process of the detection device 10 is ended.

In the driving process (step S100), the driver 54 of the controller 50 applies a voltage to the driving electrode 24 on the basis of an instruction from the controller of the electronic device transmitted via the input/output device 51 of the controller 50, and the receiver 56 of the controller 50 receives a signal representing capacitance from each of the detection electrodes 26a to 26e. The received signal representing the capacitance is stored in the storage 52 of the controller 50.

Figure 11:
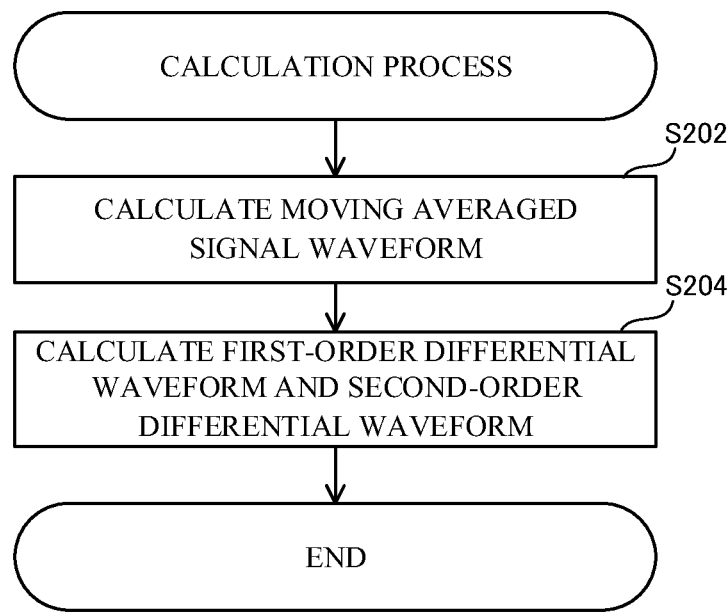
FIG. 11 is a flowchart illustrating a calculation process according to Embodiment 1.

The calculation process (step S200) is described with reference to FIG. 11. In the calculation process (step S200), a moving averaged signal waveform and a first-order differential waveform and a second-order differential waveform of the moving averaged signal waveform are calculated. First, the calculator 58 of the controller 50 performs a moving average process on a signal waveform indicating a temporal change in the signal strength of the signal received by the receiver 56, and calculates the moving averaged signal waveform in each of the detection electrodes 26a to 26e (step S202). Subsequently, the calculator 58 calculates a first-order differential waveform and a second-order differential waveform of the calculated moving averaged signal waveform (step S204).

Figure 12:
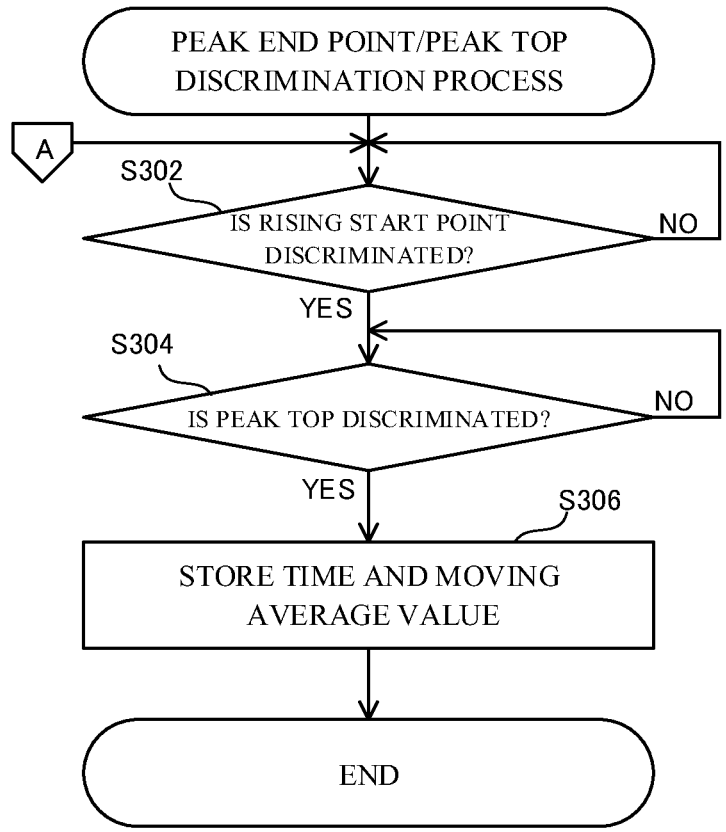
FIG. 12 is a flowchart illustrating a peak end point/peak top discrimination process according to Embodiment 1.

Next, the peak end point/peak top discrimination process (step S300) is described with reference to FIG. 12. In the peak end point/peak top discrimination process (step S300), a rising start point and a peak top in the moving averaged signal waveform are discriminated on the basis of the first-order differential waveform and the second-order differential waveform of the moving averaged signal waveform. First, the first discriminator 62 of the controller 50 discriminates the rising start point in each of the moving averaged signal waveforms from the first-order differential waveform and the second-order differential waveform of each of the moving averaged signal waveforms along the direction in which time elapses (step S302). The first discriminator 62 discriminates the rising start point by setting, as a time corresponding to the rising start point, a time when a value of the second-order differential waveform changes from a positive value to a negative value and a value of the first-order differential waveform is a positive value. Step S302 is repeated in the direction in which time elapses until the rising start point is determined (step S302; NO).

When the rising start point is discriminated (step S302; YES), the first discriminator 62 determines the peak top in each of the moving averaged signal waveforms from the first-order differential waveform of each of the moving averaged signal waveforms (step S304). The first discriminator 62 discriminates the peak top by setting, as a time corresponding to the peak top, an initial time when the value of the first-order differential waveform changes from a positive value to a negative value in the direction in which time elapses from the time corresponding to the rising start point.

Step S304 is repeated in the direction in which time elapses until the peak top is determined (step S304; NO). When the peak top is not discriminated even after the predetermined first period (for example, 100 ms) elapses from the time corresponding to the rising start point, that is, when the time corresponding to the rising start point and the time corresponding to the peak top are out of the predetermined first period, the rising start point discriminated in step S302 may be re-discriminated as not being a rising start point, and a rising start point may be discriminated again in the direction in which time elapses after returning to step S302.

When the peak top is discriminated (step S304; YES), the first discriminator 62 stores, in the storage 52, a corresponding time and a moving average value of the discriminated rising start point and a corresponding time and a moving average value of the discriminated peak top (step S306), and ends the peak end point/peak top discrimination process (step S300).

The peak discrimination process (step S400) is described with reference to FIGS. 13 and 14. In the peak discrimination process (step S400), the peak of the target in the moving averaged signal waveform is discriminated on the basis of the time width $\Delta T1$ from the rising start point to the peak top, the height $\Delta H1$ from the rising start point to the peak top, and the slope Uc on the rising side of the peak. First, the second discriminator 64 of the controller 50 calculates the time width $\Delta T1$ (difference between the time corresponding to the peak top and the time corresponding to the rising start point) and the height $\Delta H1$ (difference between the moving average value of the peak top and the moving average value of the rising start point) between the rising start point to the peak top discriminated in the peak end point/peak top discrimination process (step S300) (step S402). Subsequently, the second discriminator 64 calculates the slope Uc ($\Delta H1/\Delta T1$) on the rising side of the peak (step S404).

Next, the second discriminator 64 discriminates whether a peak is the peak of the target in the moving averaged signal waveform on the basis of the time width $\Delta T1$, the height $\Delta H1$, and the slope Uc on the rising side of the peak (Step S406). Specifically, as illustrated in FIG. 14, the second discriminator 64 discriminates, as the peak of the target in the moving averaged signal waveform, a peak in which the time width $\Delta T1$ is equal to or greater than the predetermined first threshold value Cw, the height $\Delta H1$ is equal to or higher than the predetermined second threshold value Ch, and the slope Uc on the rising side is equal to or greater than the third threshold value Cd. A peak, in which the time width $\Delta T1$ is less than the predetermined first threshold value Cw, the height $\Delta H1$ is less than the predetermined second threshold value Ch, and the slope Uc on the rising side is less than the third threshold value Cd, is noise (peak of noise).

When the peak is not discriminated as the peak of the target (step S406; NO), the detection process returns to step S302 of the peak end point/peak top discrimination process (step S300). When the peak is discriminated as the peak of the target (step S406; YES), the peak determination process (step S400) is ended.

In the present embodiment, the peak of the target is discriminated on the basis of the time width $\Delta T1$, the height $\Delta H1$, and the slope Uc on the rising side. Consequently, the peak discrimination process (step S400) can discriminate the peak of the target even though the second threshold value Ch, which is the threshold value of the height $\Delta H1$, is small. That is, the detection process can discriminate the peak of a target having a low signal strength. Furthermore, since the peak discrimination process (step S400) discriminates the peak of the target from the rising start point and the peak top, the peak of the target can be discriminated when the signal waveform reaches the peak top, and a non-contact target can be discriminated in a short time.

The non-contact detection process (step S500) is described with reference to FIGS. 15 and 16. In the non-contact detection process (step S500), the movement (user's gesture) of the discriminated target is discriminated from the time order of the peak tops of the discriminated target. First, the detector 66 of the controller 50 arranges the detection electrodes 26a to 26e in the time order of the peak tops in each moving averaged signal waveform (step S502). Subsequently, the detector 66 discriminates the movement (user's gesture) of the target by referring to a lookup table indicating the relationship between the time order of the peak tops in the moving averaged signal waveforms of the detection electrodes 26a to 26e and the movement of the target (step S504). FIG. 16 illustrates an example of the lookup table. For example, when the time order of the peak tops is the order of the detection electrode 26e, the detection electrode 26d, the detection electrode 26c, and the detection electrode 26b, the detector 66 discriminates that the user has made a flick gesture from the +X direction to the −X direction, and detects the flick gesture from the +X direction to the −X direction. The lookup table is stored in the storage 52 in advance.

When the movement of the target is detected (step S504; YES), the detector 66 outputs a signal representing the movement of the detected target to the controller of the electronic device, which is provided with the display unit 200 (detection device 10), via the input/output device 51 (step 506). When the detector 66 outputs the signal representing the movement of the target, the non-contact detection process (step S500) is ended. When the movement of the target is not detected (step S506; NO), the detection process returns to step S302 of the peak end point/peak top discrimination process (step S300).

As described above, the detection device 10 discriminates the peak of a target on the basis of the time width $\Delta T1$, the height $\Delta H1$, and the slope Uc on the rising side, so that the peak of a target having a small signal strength can be discriminated. Furthermore, the detection device 10 discriminates the peak of the target from a rising start point and a peak top, so that a non-contact target can be detected in a short time.

Embodiment 2

In Embodiment 1, the detection device 10 discriminates a rising start point of a peak and a peak top of the peak. The detection device 10 may discriminate the rising start point of the peak, the peak top of the peak, and a falling end point of the peak. Hereinafter, the falling end point of the peak is also referred to as a "falling end point".

The detection device 10 of the present embodiment includes a sensor 20 and a controller 50, similarly to the detection device 10 of Embodiment 1. Since the sensor 20 of the present embodiment is the same as the sensor 20 of Embodiment 1, the controller 50 and a detection process of the present embodiment are described below.

The controller 50 of the present embodiment includes an input/output device 51, a storage 52, a driver 54, a receiver 56, a calculator 58, a first discriminator 62, a second discriminator 64, and a detector 66, similarly to the controller 50 of Embodiment 1. Since the input/output device 51, the storage 52, the driver 54, the receiver 56, the calculator 58, the second discriminator 64, and the detector 66 of the present embodiment are the same as those of Embodiment 1, the first discriminator 62 of the present embodiment is described.

Figure 17:
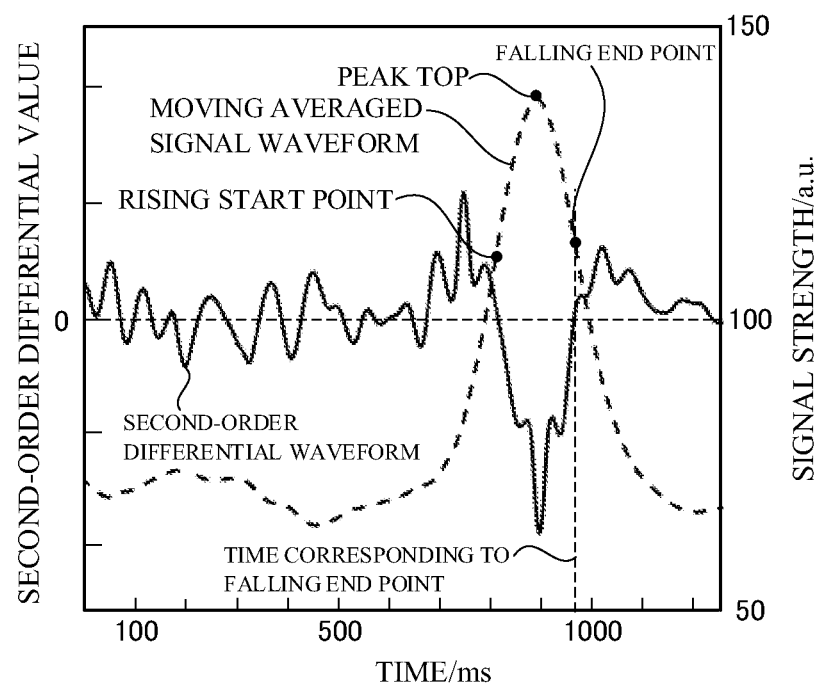
FIG. 17 is a diagram illustrating a falling end point in a moving averaged signal waveform according to Embodiment 2.

On the basis of the first-order differential waveform and the second-order differential waveform of the moving averaged signal waveform, the first discriminator 62 of the present embodiment discriminates the rising start point, the peak top, and the falling end point in the moving averaged signal waveform. The discrimination of the rising start point and the peak top is the same as in Embodiment 1. As illustrated in FIGS. 6, 7, and 17, the first discriminator 62 of the present embodiment discriminates the falling end point by setting, as a time corresponding to the falling end point, a time when the value of the second-order differential waveform changes from a negative value to a positive value and the value of the first-order differential waveform changes is a negative value in the direction in which time elapses from the time corresponding to the peak top.

Moreover, when the falling end point is not discriminated even after a predetermined second period (for example, 30 ms) elapses from the time corresponding to the peak top (that is, when the time corresponding to the peak top and the time corresponding to the falling end point are out of the predetermined second period), the first discriminator 62 of the present embodiment re-discriminates that a point, which has been discriminated as the rising start point, and a point, which has been discriminated as the peak top, are not a rising start point and a peak top, and re-discriminates a rising start point in the direction in which time elapses.

Figure 18:
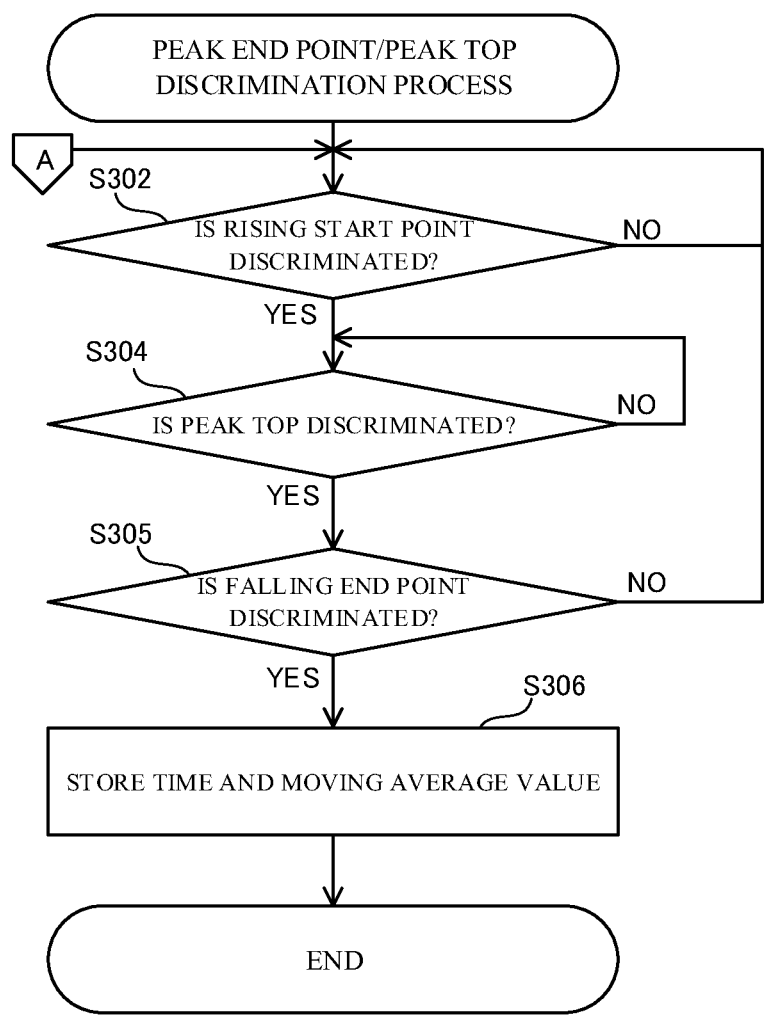
FIG. 18 is a flowchart illustrating a peak end point/peak top discrimination process according to Embodiment 2.

Next, the detection process of the present embodiment is described. The detection process of the present embodiment is performed in the order of a drive process (step S100), a calculation process (step S200), a peak end point/peak top discrimination process (step S300), a peak discrimination process (step S400), and a non-contact detection process (step S500), similarly to the detection process of Embodiment 1. Since the drive process (step S100), the peak discrimination process (step S400), and the non-contact detection process (step S500) of the present embodiment are the same as those of Embodiment 1, the peak end point/peak top discrimination process (step S300) of the present embodiment is described with reference to FIG. 18.

First, similarly to the peak end point/peak top discrimination process (step S300) of Embodiment 1, the first discriminator 62 of the controller 50 discriminates the rising start point (step S302) and discriminates the peak top (step S304). When the peak top is discriminated (step S304; YES), the first discriminator 62 discriminates the falling end point in each of the moving averaged signal waveforms from the first-order differential waveform and a second-order differential waveform of each of the moving averaged signal waveforms (step S305).

Specifically, the first discriminator 62 discriminates the falling end point by setting, as the time corresponding to the falling end point, the time when the value of the second-order differential waveform changes from a negative value to a positive value and the value of the first-order differential waveform changes is a negative value in the direction in which time elapses from the time corresponding to the peak top. When the falling end point is not discriminated even after the predetermined second period elapses from the time corresponding to the peak top (step S305; NO), the rising start point discriminated in step S302 and the peak top discriminated in step S304 are re-discriminated as not being a rising start point and a peak top, respectively, and the peak end point/peak top discrimination process (step S300) is returned to step S302.

When the falling end point is discriminated with the predetermined second period from the time corresponding to the peak top (step S305; YES), the first discriminator 62 stores, in the storage 52, a corresponding time and a moving average value of the discriminated rising start point and a corresponding time and a moving average value of the discriminated peak top (step S306), and ends the peak end point/peak top discrimination process (step S300).

In the present embodiment, a rising start point and a peak top (that is, the presence or absence of a peak) are discriminated depending on whether a falling end point exists within the predetermined second period from a time corresponding to the peak top. As a result, the detection device 10 of the present embodiment can suppress an increase in signal strength not caused by the movement of a target from being discriminated as a peak, and can suppress erroneous detection. Furthermore, the detection device 10 of the present embodiment can discriminate the peak of a target having a small signal strength, similarly to the detection device 10 of Embodiment 1.

Embodiment 3

In Embodiment 1 and Embodiment 2, the detection device 10 detects the movement of a target from a signal waveform of each of the detection electrodes 26a to 26e. The detection device 10 may detect the movement of a target from a signal waveform obtained by averaging signal waveforms of detection electrodes (for example, the detection electrodes 26b to 26e).

In the present embodiment, the detection device 10 detects the movement of a target from a signal waveform of each of the detection electrodes 26a to 26e and a signal waveform obtained by averaging the signal waveforms of the detection electrodes 26b to 26e. The detection device 10 of the present embodiment includes a sensor 20 and a controller 50, similarly to the detection device 10 of Embodiment 1. Since the sensor 20 of the present embodiment is the same as the sensor 20 of Embodiment 1, the controller 50 and a detection process of the present embodiment are described below.

The controller 50 of the present embodiment includes an input/output device 51, a storage 52, a driver 54, a receiver 56, a calculator 58, a first discriminator 62, a second discriminator 64, and a detector 66, similarly to the controller 50 of Embodiment 1. Since the input/output device 51, the storage 52, the driver 54, and the receiver 56 of the present embodiment are the same as those of Embodiment 1, the calculator 58, a first discriminator 62, the second discriminator 64, and the detector 66 of the present embodiment are described.

Similar to the calculator 58 of Embodiment 1, the calculator 58 of the present embodiment calculates moving averaged signal waveforms of the detection electrodes 26a to 26e from signals received by the receiver 56.

Figures 19, 20:
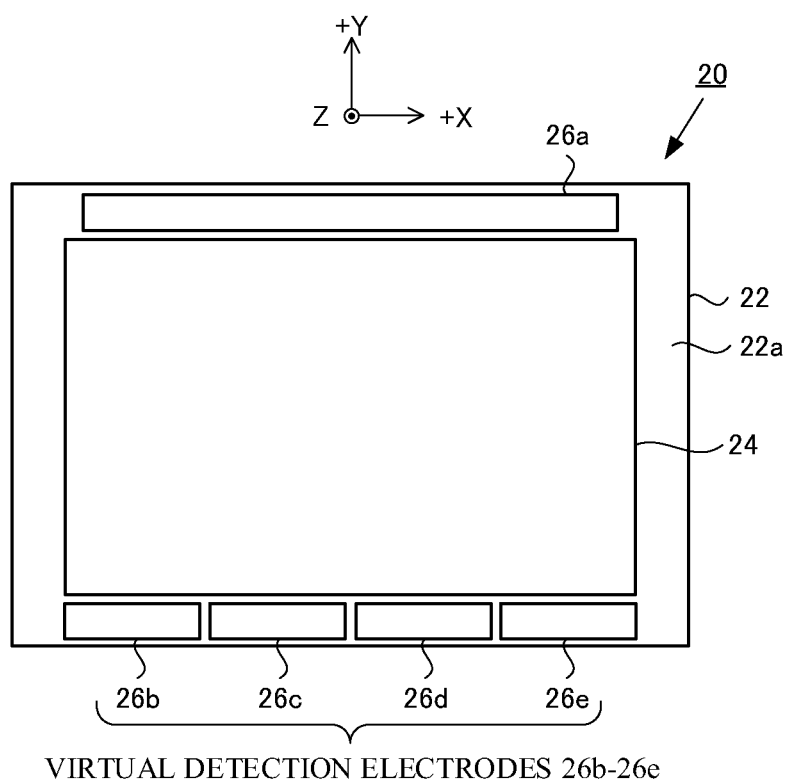
FIG. 19 is a schematic diagram illustrating virtual detection electrodes according to Embodiment 3.
FIG. 20 is a diagram illustrating an example of a time order of peak tops corresponding to a flick gesture from a +Y direction to a —Y direction according to Embodiment 3.

Then, the calculator 58 of the present embodiment sets a virtual detection electrode including detection electrodes, and calculates a moving averaged signal waveform of the virtual detection electrode. In the present embodiment, as illustrated in FIG. 19, virtual detection electrode 26b-26e is configured from the detection electrodes 26b to 26e. The calculator 58 of the present embodiment calculates an average signal waveform 26b-26e obtained by averaging the signal waveforms of the detection electrodes 26b to 26e, as a signal waveform of the virtual detection electrode 26b-26e. Then, the calculator 58 of the present embodiment calculates a moving averaged average signal waveform 26b-26e by performing a moving average process on the average signal waveform 26b-26e.

Then, the calculator 58 of the present embodiment calculates first-order differential waveforms and second-order differential waveforms of the moving averaged signal waveforms of the detection electrodes 26a to 26e and the moving averaged average signal waveform 26b-26e.

The first discriminator 62 of the present embodiment discriminates rising start points and peak tops in the moving averaged signal waveforms of the detection electrodes 26a to 26e and the moving averaged average signal waveform 26b-26e of the virtual detection electrode 26b-26e. The discrimination of the rising start points and the peak tops is the same as in Embodiment 1.

The second discriminator 64 of the present embodiment discriminates a peak of a target in the moving averaged signal waveforms of the detection electrodes 26a to 26e and the moving averaged average signal waveform 26b-26e of the virtual detection electrode 26b-26e. The discrimination of the peak of the target is the same as in Embodiment 1.

The detector 66 of the present embodiment discriminates the movement of the target from the time order of the peak tops of the peaks of the target in the moving averaged signal waveform of each of the detection electrodes 26a to 26e and the moving averaged average signal waveform 26b-26e. For example, when the peak top of the peak of the target appears in the order of the detection electrode 26a and the virtual detection electrode 26b-26e in the direction in which time elapses, the detector 66 discriminates that a user has made a flick gesture from the +Y direction to the −Y direction, and detects the user's flick gesture from the +Y direction to the −Y direction.

Figure 21:
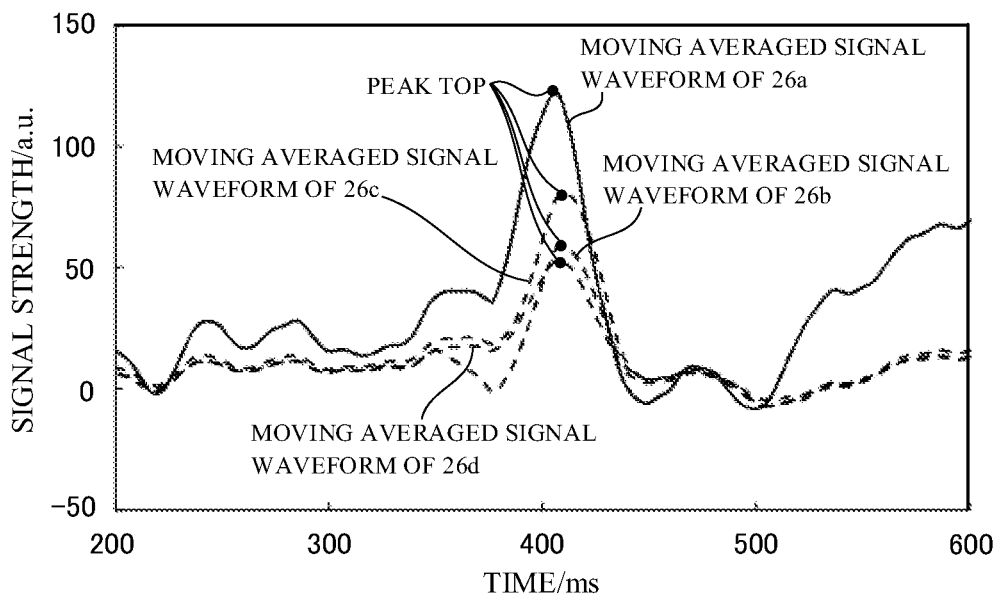
FIG. 21 is a diagram illustrating moving averaged signal waveforms according to Embodiment 3.

When the flick gesture from the +Y direction to the −Y direction is discriminated only from the time order of the peak tops of the detection electrodes 26a to 26e, there are time orders of the peak tops corresponding to the flick gesture from the +Y direction to the −Y direction as illustrated in FIG. 20, which may complicate discrimination. Furthermore, as illustrated in FIG. 21, a signal strength difference and a time difference at the peak tops are reduced, and discrimination may be difficult.

Figure 22:
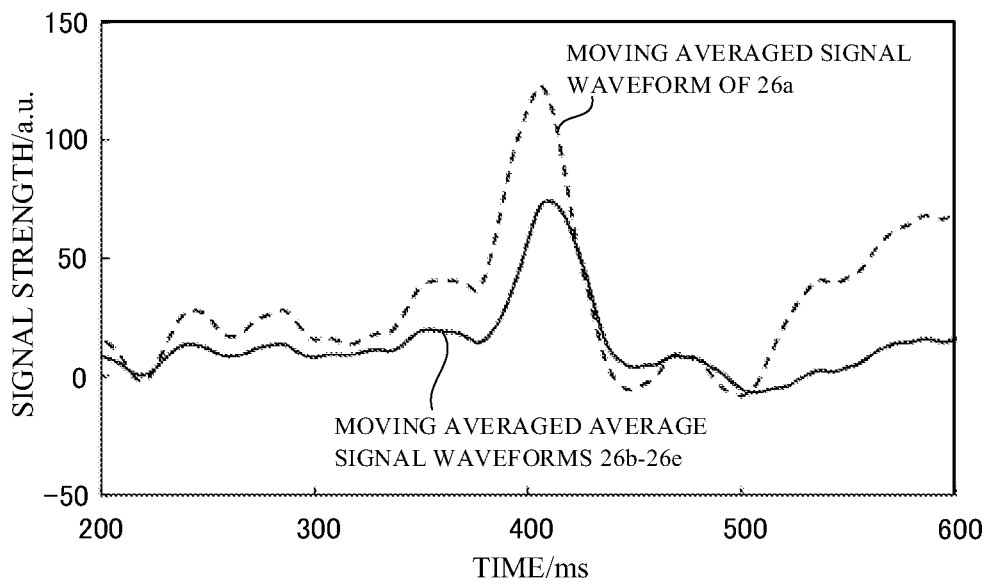
FIG. 22 is a diagram illustrating moving averaged average signal waveforms according to Embodiment 3.

In the present embodiment, when the peak top appears in the order of the detection electrode 26a and the virtual detection electrode 26b-26e, since it is discriminated that the user has made a flick gesture from the +Y direction to the −Y direction, the detection device 10 of the present embodiment can easily discriminate the movement of a target. Furthermore, as illustrated in FIG. 22, the number of signal waveforms to be discriminated is reduced, so that the detection device 10 of the present embodiment can easily discriminate the movement of a target.

The detector 66 of the present embodiment outputs a signal representing the movement of the detected target to the controller of the electronic device provided with the detection device 10. The signal representing the movement of the target represents, for example, a key event, a message, or the like set by the user for a flick gesture in the −Y direction. The detector 66 of the present embodiment may also detect a flick gesture from the +Y direction to the −Y direction from the time order of the peak tops of the detection electrode 26a, the peak tops of the virtual detection electrode 26b-26e, and the peak tops of the detection electrodes 26b to 26e.

Next, the detection process of the present embodiment is described. The detection process of the present embodiment is performed in the order of a drive process (step S100), a calculation process (step S200), a peak end point/peak top discrimination process (step S300), a peak discrimination process (step S400), and a non-contact detection process (step S500), similarly to the detection process of Embodiment 1. Since the drive process (step S100) of the present embodiment is the same as that of Embodiment 1, the calculation process (step S200), the peak end point/peak top discrimination process (step S300), the peak discrimination process (step S400), and the non-contact detection process (step S500) of the present embodiment are described.

In the calculation process (step S200) of the present embodiment, the calculator 58 calculates, as the signal waveform of the virtual detection electrode 26b-26e, the average signal waveform 26b-26e obtained by averaging the signal waveforms of the detection electrodes 26b to 26e, and further calculates the moving averaged average signal waveform 26b-26e. The calculator 58 calculates the first-order differential waveform and the second-order differential waveform of the moving averaged average signal waveforms 26b-26e. The other processes in the calculation process (step S200) of the present embodiment are the same as the calculation process (step S200) of Embodiment 1.

In the peak end point/peak top discrimination process (step S300) of the present embodiment, the first discriminator 62 discriminates the rising start points and the peak tops in the moving averaged signal waveforms of the detection electrodes 26a to 26e and the moving averaged average signal waveform 26b-26e on the basis of the calculated first-order differential waveforms and second-order differential waveforms. The other processes in the peak end point/peak top discrimination process (step S300) of the present embodiment are the same as the peak end point/peak top discrimination process (step S300) of Embodiment 1.

In the peak discrimination process (step S400) of the present embodiment, the second discriminator 64 discriminates the peak of the target in the moving averaged signal waveforms of the detection electrodes 26a to 26e and the moving averaged average signal waveform 26b-26e on the basis of the time width ΔT1 from the rising start point to the peak top, the height ΔH1 from the rising start point to the peak top, and the slope Uc on the rising side of the peak. The other processes in the peak discrimination process (step S400) of the present embodiment are the same as the peak discrimination process (step S400) of Embodiment 1.

In the non-contact detection process (step S500) of the present embodiment, the detector 66 discriminates the movement (user's gesture) of the discriminated target from the time order of the peak tops of the peaks of the discriminated target. Similar to Embodiment 1, the detector 66 discriminates the movement of the target by referring to the lookup table indicating the relationship between the time order of the peak tops and the movement of the target.

As described above, the detection device 10 of the present embodiment discriminates the movement of a target from signal waveforms obtained by averaging signal waveforms of detection electrodes (detection electrodes 26b to 26e), so that the target can be easily detected. Furthermore, the detection device 10 of the present embodiment can discriminate the peak of a target having a small signal strength, similarly to the detection device 10 of Embodiment 1.

Embodiment 4

In Embodiment 1 to Embodiment 3, the detection device 10 discriminates the movement of a target from the time order of peak tops. The detection device 10 may discriminate the movement of the target from the time interval of the peak tops.

In the present embodiment, the detection device 10 discriminates the movement of the target from the time order of the peak tops and the time interval of the peak tops. The detection device 10 of the present embodiment includes a sensor 20 and a controller 50, similarly to the detection device 10 of Embodiment 1. Since the sensor 20 of the present embodiment is the same as the sensor 20 of Embodiment 1, the controller 50 and a detection process of the present embodiment are described below.

Similarly to the controller 50 of Embodiment 3, the controller 50 of the present embodiment includes an input/output device 51, a storage 52, a driver 54, a receiver 56, a calculator 58, a first discriminator 62, a second discriminator 64, and a detector 66, similarly to the controller 50 of Embodiment 3. Since the input/output device 51, the storage 52, the driver 54, the receiver 56, the calculator 58, a first discriminator 62, and the second discriminator 64 of the present embodiment are the same as those of Embodiment 3, the detector 66 of the present embodiment is described.

The detector 66 of the present embodiment classifies the type of movement of a target to be discriminated (type of gesture to be discriminated) from time intervals between the peak tops of the detection electrodes 26a to 26e and the peak tops of the virtual detection electrode 26b-26e. The detector 66 of the present embodiment classifies, for example, the type of the movement of the target to be discriminated into a flick gesture and a circle gesture from time intervals between the peak tops in the moving averaged signal waveform of the detection electrode 26a and the peak tops in the moving averaged average signal waveform 26b-26e of the virtual detection electrode 26b-26e.

Specifically, when a time interval T2 between the peak top of the detection electrode 26a and the peak top of the virtual detection electrode 26b-26e is equal to or less than a predetermined fourth threshold value th4, the detector 66 classifies the type of the movement of the target to be discriminated into the flick gesture. When the time interval T2 between the peak top of the detection electrode 26a and the peak top of the virtual detection electrode 26b-26e is greater than the predetermined fourth threshold value th4 and smaller than a predetermined fifth threshold value th5, the detector 66 classifies the type of the movement of the target to be discriminated into the circle gesture. Since the time from the start to the end of a movement in the flick gesture is shorter than the time from the start to the end of a movement in the circle gesture, the detector 66 can classify the type of the movement of the target to be discriminated into the flick gesture and the circle gesture according to the time interval of the peak tops.

Figure 23:
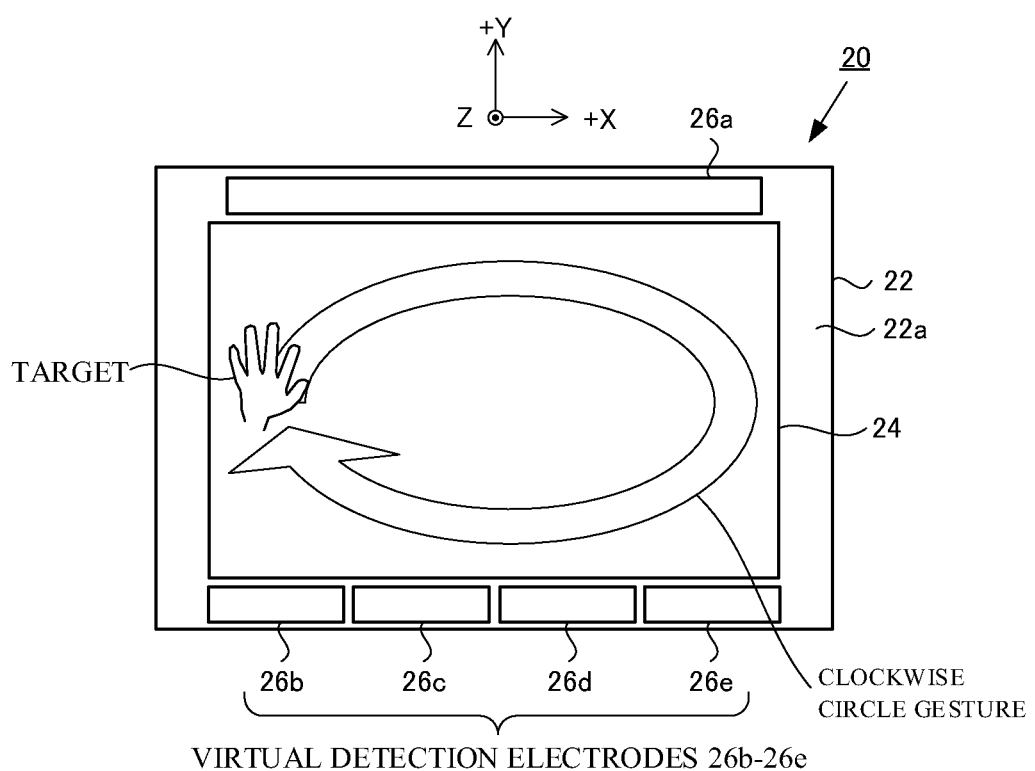
FIG. 23 is a schematic diagram illustrating a clockwise circle gesture according to Embodiment 4.

The detector 66 of the present embodiment further discriminates the movement of the target from the time order of the peak tops of the detection electrodes 26a to 26e and the peak tops of the virtual detection electrode 26b-26e for each classified type of movement of the target to be discriminated. For example, when the type of the movement of the target to be discriminated is discriminated as the circle gesture and the time order of the peak tops is the order of the peak top of the detection electrode 26a and the peak top of the virtual detection electrode 26b-26e, the movement of the target is discriminated as a clockwise circle gesture as illustrated in FIG. 23. On the other hand, when the type of the movement of the target to be discriminated is discriminated as the circle gesture and the time order of the peak tops is not a time order set in advance, it is discriminated that there is no movement of the target. Furthermore, when the type of the movement of the target to be discriminated is discriminated as the flick gesture and the time order of the peak tops is the order of the peak top of the detection electrode 26a and the peak top of the virtual detection electrode 26b-26e, it is discriminated that the movement of the target is a flick gesture from the +Y direction to the -Y direction.

In the present embodiment, the detection device 10 discriminates the movement of a target from the time order of peak tops and the time interval of the peak tops, so that movements of a wider variety of target can be more easily discriminated.

Figure 24:
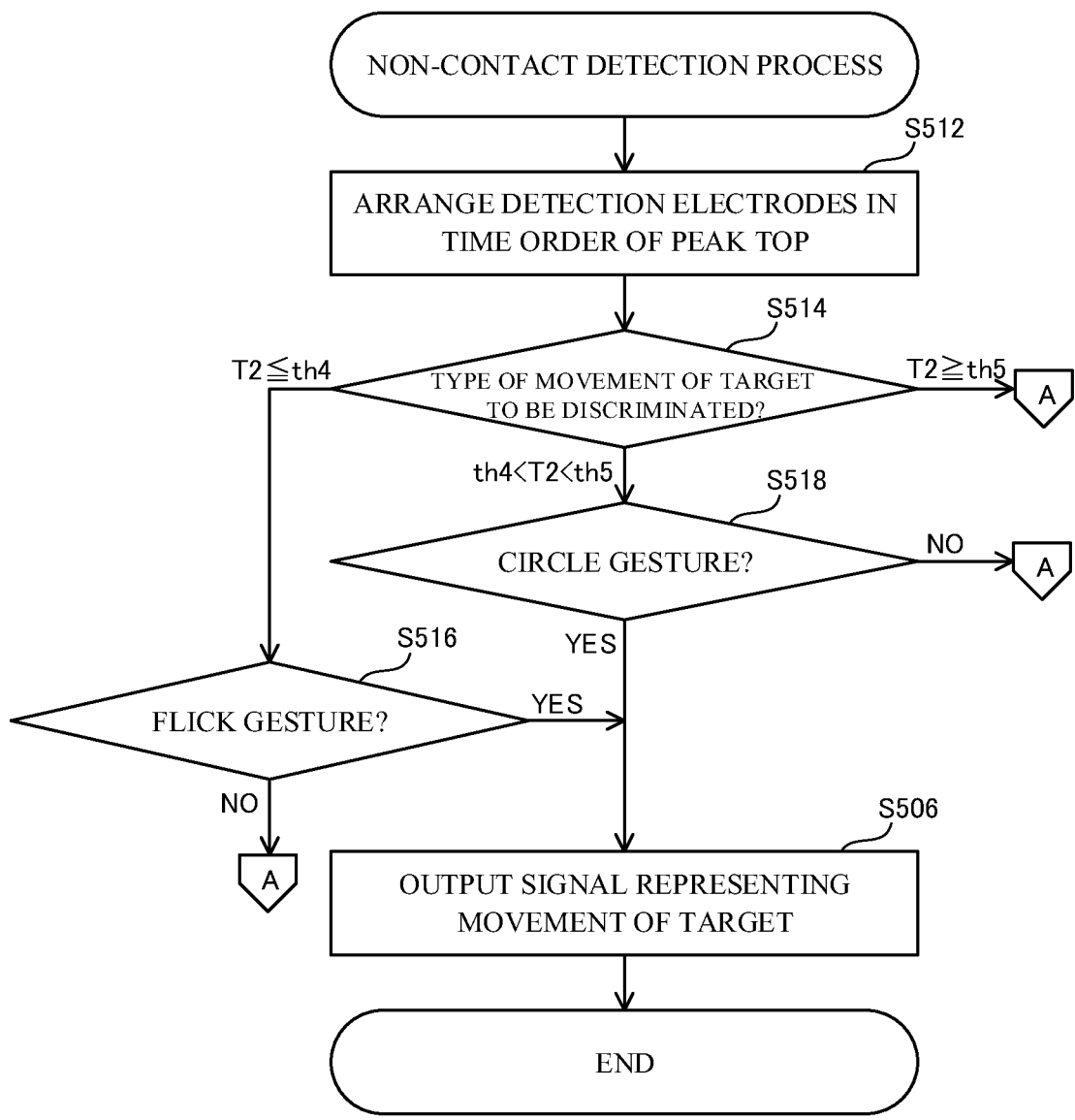
FIG. 24 is a flowchart illustrating a non-contact detection process according to Embodiment 4.

Next, the detection process of the present embodiment is described. The detection process of the present embodiment is performed in the order of a drive process (step S100), a calculation process (step S200), a peak end point/peak top discrimination process (step S300), a peak discrimination process (step S400), and a non-contact detection process (step S500), similarly to the detection process of Embodiment 1. Since the drive process (step S100), the calculation process (step S200), the peak end point/peak top discrimination process (step S300), and the peak discrimination process (step S400) are the same as those of Embodiment 3, the non-contact detection process (step S500) of the present embodiment is described with reference to FIG. 24.

In the non-contact detection process (step S500) of the present embodiment, first, the detector 66 of the controller 50 arranges the detection electrodes 26a to 26e and the virtual detection electrode 26b-26e in the time order of the peak top (step S512). Next, the detector 66 classifies the type of the movement of the target to be discriminated (type of user's gesture) from the time intervals between the peak tops of the detection electrodes 26a to 26e and the peak tops of the virtual detection electrode 26b-26e (step S514). Specifically, when the time interval T2 between the peak top of the detection electrode 26a and the peak top of the virtual detection electrode 26b-26e is equal to or less than the predetermined fourth threshold value th4, the detector 66 classifies the type of the movement of the target to be discriminated into the flick gesture (step S514; T2≤th4). When the time interval T2 between the peak top of the detection electrode 26a and the peak top of the virtual detection electrode 26b-26e is greater than the predetermined fourth threshold value th4 and smaller than the predetermined fifth threshold value th5, the detector 66 classifies the type of the movement of the target to be discriminated into the circle gesture (step S514; th4<T2<th5). Moreover, when the time interval T2 between the peak top of the detection electrode 26a and the peak top of the virtual detection electrode 26b-26e is the predetermined fifth threshold value th5, the detection process returns to step S302 of the peak end point/peak top discrimination process (step S300).

When the type of the movement of the target to be determined is the flick gesture (step S514; T2≤th4), the detector 66 detects the movement of the target by referring to a lookup table indicating the relationship between the time order of the peak tops and the movement of the target in the flick gesture (step S516). When the movement of the target is not detected (step S514; NO), the detection process returns to step S302 of the peak end point/peak top discrimination process (step S300).

On the other hand, when the type of the movement of the target to be discriminated is the circle gesture (step S514; th4<T2<th5), the detector 66 detects the movement of the target by referring to a lookup table indicating the relationship between the time order of the peak tops and the movement of the target in the circle gesture (step S518). When the movement of the target is not detected (step S518; NO), the detection process returns to step S302 of the peak end point/peak top discrimination process (step S300).

When the movement of the target is detected in step S516 or step S516 (step S516; YES or step S518; YES), the detector 66 outputs a signal representing the movement of the detected target to the controller of the electronic device provided with the display unit 200 (detection device 10) (step 506). When the detector 66 outputs the signal representing the movement of the target, the non-contact detection process (step S500) is ended.

As described above, the detection device 10 of the present embodiment discriminates the movement of a target from the time order of peak tops and the time interval of the peak tops, so that movements of a wider variety of targets can be more easily discriminated. Furthermore, the detection device 10 of the present embodiment can discriminate the peak of a target having a small signal strength.

Modification

Although the embodiments have been described above, the present disclosure can be changed in various ways without departing from the gist.

For example, the number and arrangement of the detection electrodes of the sensor 20 are arbitrary. For example, the detection electrodes may be arranged on the +X side and the -X side of the driving electrode 24 to surround the driving electrode 24. Furthermore, the sensor 20 may include driving electrodes 24.

Figure 25:
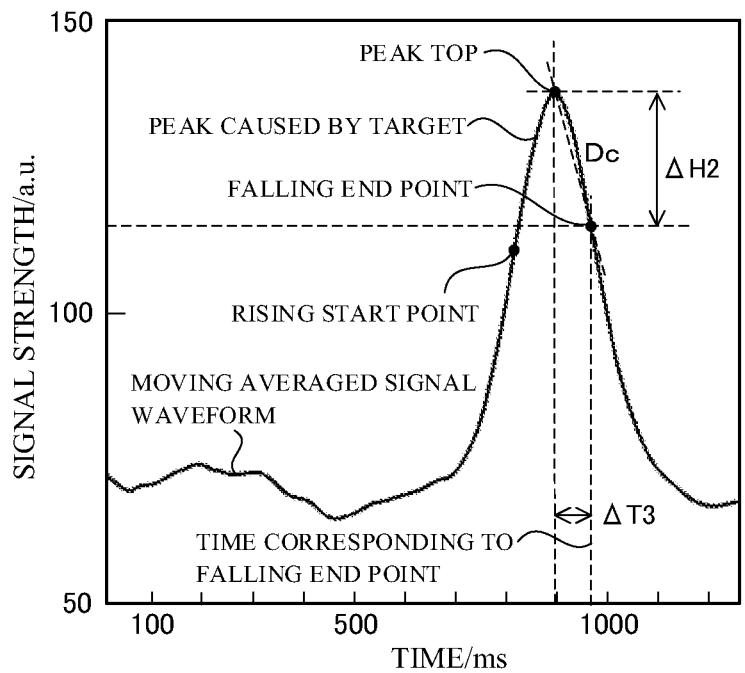
FIG. 25 is a diagram illustrating a falling end point in a moving averaged signal waveform according to a modification.

The detection device 10 may discriminate the peak of a target on the basis of at least one of a time width ΔT3 from a falling end point to a peak top, a height ΔH2 from the falling end point to the peak top, and a slope Dc (ΔH2/ΔT3) on a falling side of the peak illustrated in FIG. 25, in addition to the time width ΔT1 from the rising start point to the peak top, the height ΔH1 from the rising start point to the peak top, or the slope Uc on the rising side of the peak.

In the embodiments, the detection device 10 performs a moving average process on a signal waveform indicating a change in signal strength over time. The detection device 10 may not perform the moving average process on the signal waveform indicating a change in signal strength over time. For example, the detection device 10 may discriminate a rising start point and a peak top on the basis of a first-order differential waveform and a second-order differential waveform of a signal waveform received by the receiver 56.

Figure 26:
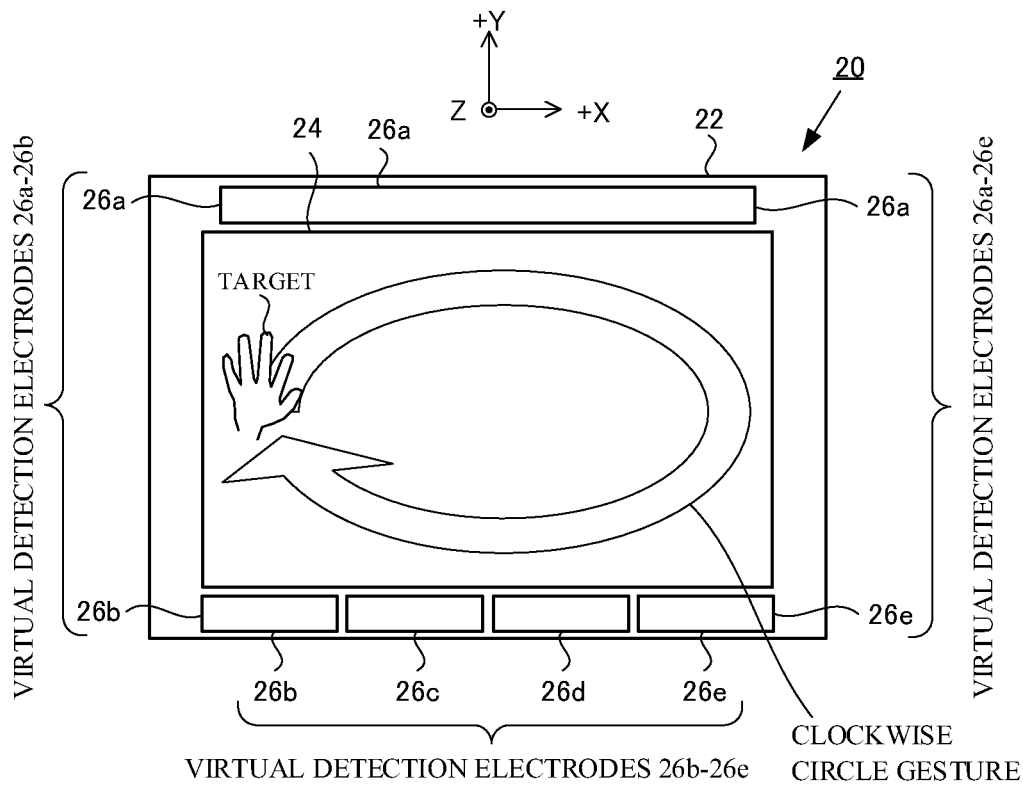
FIG. 26 is a schematic diagram illustrating virtual detection electrodes according to according to a modification.

In Embodiment 3, the movement of a target is detected from the signal waveform obtained by averaging the signal waveforms of the detection electrodes 26b to 26e (average signal waveform 26b-26e of the virtual detection electrode 26b-26e). The detection electrodes constituting the virtual detection electrode are not limited to the detection electrodes 26b to 26e. For example, as illustrated in FIG. 26, the virtual detection electrodes may be configured from the detection electrode 26a and the detection electrode 26b (virtual detection electrode 26a-26b), and the detection electrode 26a and the detection electrode 26e (virtual detection electrode 26a-26e). For example, when peak tops appear in the order of the virtual detection electrodes 26a-26b, the detection electrode 26a, the virtual detection electrode 26a-26e, and the virtual detection electrode 26b-26e, the detection device 10 can discriminate a clockwise circle gesture.

The controller 50 may include dedicated hardware such as an application specific integrated circuit (ASIC), a field-programmable gate array (FPGA), and a control circuit. In this case, each of the processes may be performed by individual hardware. Furthermore, the processes may be collectively performed by single hardware. Some of the processes may be performed by dedicated hardware, and others of the processes may be performed by software or firmware.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A detection device, comprising:
  a sensor including a driving electrode and detection electrodes; and
  a controller detecting a non-contact target from signal waveforms acquired from the detection electrodes by applying a voltage to the driving electrode, the signal waveforms each indicating a change in signal strength over time,
  wherein the controller discriminates a peak caused by the non-contact target on the basis of a time width from a rising start point of a peak to a peak top of the peak, a height from the rising start point of the peak to the peak top of the peak, and a slope of a rising side of the peak, in the signal waveform.

2. The detection device according to claim 1, wherein the controller discriminates the rising start point of the peak and the peak top of the peak on the basis of a first-order differential waveform and a second-order differential waveform of the signal waveform.

3. The detection device according to claim 2, wherein the controller discriminates the rising start point of the peak and the peak top of the peak by setting, as a time corresponding to the rising start point of the peak, a time when a value of the second-order differential waveform changes from a positive value to a negative value and a value of the first-order differential waveform is a positive value, and setting, as a time corresponding to the peak top of the peak, an initial time when the value of the first-order differential waveform changes from a positive value to a negative value in a direction in which time elapses from the time corresponding to the rising start point of the peak.

4. The detection device according to claim 3, wherein, when the time corresponding to the rising start point of the peak and the time corresponding to the peak top of the peak are out of a predetermined first period, the controller discriminates a rising start point of a next peak in the direction in which time elapses from the time corresponding to the rising start point of the peak.

5. The detection device according to claim 3, wherein the controller sets, as a time corresponding to a falling end point of the peak, an initial time when the value of the second-order differential waveform changes from a negative value to a positive value and the value of the first-order differential waveform is a negative value in the direction in which time elapses from the time corresponding to the peak top of the peak, and when the time corresponding to the peak top of the peak and the time corresponding to the falling end point of the peak are out of a predetermined second period, the controller discriminates a rising start point of a next peak in the direction in which time elapses from the time corresponding to the peak top of the peak.

6. The detection device according to claim 5, wherein the controller discriminates the peak caused by the non-contact target on the basis of at least one of a time width from the falling end point of the peak to the peak top of the peak, a height from the falling end point of the peak to the peak top of the peak, or a slope of a falling side of the peak.

7. The detection device according to claim 1, wherein the signal waveforms are a signal waveform acquired from each of the detection electrodes and indicating a change in signal strength over time, and average signal waveforms obtained by averaging the signal waveforms of the detection electrodes.

8. The detection device according to claim 1, wherein the controller discriminates a movement of the non-contact target from a time order of the peak top of a peak discriminated as the peak caused by the non-contact target in each of the signal waveforms.

9. The detection device according to claim 8, wherein the movement of the non-contact target is discriminated from a time interval of the peak top of the peak discriminated as the peak caused by the non-contact target.

10. A detection method, comprising:
acquiring signal waveforms from detection electrodes by applying a voltage to a driving electrode, the signal waveforms each indicating a change in signal strength over time;
discriminating a peak caused by a non-contact target on the basis of a time width from a rising start point of a peak to a peak top of the peak, a height from the rising start point of the peak to the peak top of the peak, and a slope of a rising side of the peak, in the signal waveform; and
detecting the non-contact target on the basis of the discriminated peak caused by the non-contact target.

11. The detection method according to claim 10, further comprising:
discriminating the rising start point of the peak and the peak top of the peak on the basis of a first-order differential waveform and a second-order differential waveform of the signal waveform.

* * * * *